United States Patent
Kikuchi et al.

(10) Patent No.: US 9,005,516 B2
(45) Date of Patent: Apr. 14, 2015

(54) MANUFACTURING METHOD OF ZEOLITE STRUCTURE

(75) Inventors: Yoshio Kikuchi, Nagoya (JP); Haruo Otsuka, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 220 days.

(21) Appl. No.: 13/052,352

(22) Filed: Mar. 21, 2011

(65) Prior Publication Data

US 2011/0237426 A1    Sep. 29, 2011

(30) Foreign Application Priority Data

Mar. 25, 2010 (JP) .................... 2010-070115

(51) Int. Cl.
C04B 38/00 (2006.01)
C04B 35/18 (2006.01)
(Continued)

(52) U.S. Cl.
CPC .............. *C01B 39/02* (2013.01); *B82Y 30/00* (2013.01); *C04B 35/18* (2013.01); *C04B 35/6263* (2013.01); *C04B 35/62813* (2013.01); *C04B 35/6303* (2013.01); *C04B 35/6316* (2013.01); *C04B 38/0006* (2013.01); *C04B 2235/3218* (2013.01); *C04B 2235/3272* (2013.01); *C04B 2235/3281* (2013.01); *C04B 2235/3418* (2013.01); *C04B 2235/3463* (2013.01);
(Continued)

(58) Field of Classification Search
CPC .... C01B 39/02; C04B 35/18; C04B 35/6306; C04B 35/6316; C04B 38/0006; C04B 2235/3418; C04B 2235/3463

USPC .......................................... 264/621
See application file for complete search history.

(56) References Cited

U.S. PATENT DOCUMENTS

2002/0072467 A1* 6/2002 Ogawa ........................ 502/65
2007/0259770 A1   11/2007 Hofmann et al.
(Continued)

FOREIGN PATENT DOCUMENTS

EP    1 192 993 A1   4/2002
JP    3272446 B2     4/2002
(Continued)

OTHER PUBLICATIONS

Nissan Chemical America Corporation. "SNOWTEX®", May 6, 2009. [online] [retrieved on Feb. 21, 2013]. Retrieved from the Internet: <URL: http://web.archive.org/web/20090506035316/http://www.nissanchem-usa.com/snowtex.php>.*
(Continued)

Primary Examiner — Erin Snelting
(74) Attorney, Agent, or Firm — Burr & Brown, PLLC (57) ABSTRACT

The manufacturing method includes a mixing step of mixing a plurality of zeolite particles, an inorganic binding material and an organic binder, to prepare a zeolite raw material, a forming step of extruding the zeolite raw material to obtain a formed zeolite article, and a firing step of firing the formed zeolite article to prepare the zeolite structure. The mixing step includes an inorganic binding material containing at least one type of silica sol selected from the group consisting of acid silica sol, silica sol containing silica particles coated with alumina, cationic silica sol, silica sol containing string-like silica particles, and silica sol containing bead-like silica particles. A content ratio of silica particles contained in the silica sol selected from the group is from 10 to 30 mass% with respect to 100 mass% of the zeolite particles.

24 Claims, 2 Drawing Sheets (51) Int. Cl.

| | | |
|---|---|---|
| *C04B 35/63* | (2006.01) | |
| *C04B 35/64* | (2006.01) | |
| *B01J 20/30* | (2006.01) | |
| *C01B 39/02* | (2006.01) | |
| *B82Y 30/00* | (2011.01) | |
| *C04B 35/626* | (2006.01) | |
| *C04B 35/628* | (2006.01) | |

(52) U.S. Cl.
CPC ... *C04B2235/528* (2013.01); *C04B 2235/5445* (2013.01); *C04B 2235/5454* (2013.01); *C04B 2235/606* (2013.01); *C04B 2235/96* (2013.01)

(56) References Cited

U.S. PATENT DOCUMENTS

2009/0291252 A1* 11/2009 Ohno et al. .................. 428/116
2009/0291253 A1  11/2009 Ohno et al.

FOREIGN PATENT DOCUMENTS

| JP | 2007-296521 A1 | 11/2007 |
| JP | 2008-169104 A1 | 7/2008 |
| WO | 2009/141878 A1 | 11/2009 |

OTHER PUBLICATIONS

U.S. Appl. No. 13/050,381, filed Mar. 17, 2011, Yoshio Kikuchi.
U.S. Appl. No. 13/052,390, filed Mar. 21, 2011, Yoshio Kikuchi.
U.S. Appl. No. 13/069,753, filed Mar. 23, 2011, Yoshio Kikuchi.
U.S. Appl. No. 13/050,302, filed Mar. 17, 2011, Yoshio Kikuchi.
Extended European Search Report (Application No. 11250346.1) dated Jun. 3, 2014.

* cited by examiner

MANUFACTURING METHOD OF ZEOLITE STRUCTURE

BACKGROUND OF THE INVENTION

1. Field of the Invention

The present invention relates to a manufacturing method of a zeolite structure. More particularly, it relates to a manufacturing method of a zeolite structure having an excellent mechanical strength.

2. Description of the Related Art

It is known that zeolite is a type of silicate having a network crystal structure provided with fine pores having a uniform diameter, there are present various chemical compositions represented by the general formula: $W_mZ_nO_{2n} \cdot sH_2O$ (W: sodium, potassium, calcium or the like, Z: silicon, aluminum or the like, and s takes various values), and there are present many kinds (types) of crystal structures having different pore shapes. Zeolite has an inherent adsorption ability, catalyst performance, solid acid characteristics, ion exchange ability and the like based on the respective chemical compositions or crystal structures, and is utilized in various use applications such as an adsorbing material, a catalyst, a catalyst carrier, a gas separation film, and an ion exchanger.

For example, MFI-type zeolite (also referred to as "ZSM-5 type zeolite") is zeolite provided with pores each having a size of about 0.5 nm by oxygen ten-membered rings among crystals, and is utilized in a use application such as an adsorbing material which adsorbs nitrogen oxides (NOx), hydrocarbons (HC) or the like from a car exhaust gas, or a gas separation film which selectively separates only p-xylene from a xylene isomer. Moreover, Deca-Dodecasil 3R (DDR) type zeolite is zeolite provided with pores of about 0.44×0.36 nm by oxygen eight-membered rings among crystals, and is utilized in a use application such as a gas separation film which selectively separates/removes only carbon dioxide from a natural gas or a biological gas to improve purity of methane which is useful as a fuel.

Moreover, for the purpose of removing NOx or the like contained in an exhaust gas discharged from an engine for a car, an engine for a construction machine, an industrial stational engine, a burning apparatus or the like or adsorbing hydrocarbons or the like from the exhaust gas, as a ceramic carrier (a honeycomb structure) made of cordierite or the like and having a honeycomb shape, there is used a catalyst material onto which zeolite subjected to an ion exchange treatment is loaded.

When zeolite is loaded onto the above ceramic carrier made of cordierite or the like as described above, cordierite or the like does not exert a function of removing NOx, a function of adsorbing hydrocarbons or the like. Therefore, when cordierite or the like is present, a pressure loss during passing of the exhaust gas, accordingly, increases.

To solve this problem, there is suggested a method of forming and firing a forming raw material containing zeolite subjected to an ion exchange treatment between cations of zeolite and metal ions, to form a honeycomb structure itself (e.g., see Patent Documents 1 to 4).

[Patent Document 1] JP-A-2007-296521
[Patent Document 2] Japanese Patent No. 3272446
[Patent Document 3] JP-A-2008-169104
[Patent Document 4] WO2009/141878A1

However, the above conventional zeolite structure has a problem that a mechanical strength such as a bending strength is low. In particular, when the honeycomb structure itself is made of zeolite, the structure is installed and used in an exhaust system of a car. Therefore, the conventional zeolite structure has a problem that the structure is broken or deformed due to vibrations of the car or the like.

To solve the problem of the mechanical strength in the conventional zeolite structure, for example, Patent Document 3 discloses a zeolite structure including silica sol as an inorganic binder, to improve a mechanical strength. However, heretofore used typical silica sol has a spherical shape, is stabilized with sodium ions, and contains stable (alkaline) silica particles in an alkaline region. Such silica sol is mixed with zeolite particles having acidity and neutralized. When silica sol shifts to a neutral region, silica particles in silica sol are mutually agglomerated. Therefore, binding points between silica particles and the zeolite particles decrease, and silica particles cannot sufficiently be bound to the zeolite particles. The zeolite structure including heretofore used typical silica sol has a problem that a mechanical strength thereof lowers.

SUMMARY OF THE INVENTION

The present invention has been develop in view of the above problem, and an object thereof is to provide a manufacturing method of a zeolite structure having an excellent mechanical strength.

The present inventors have intensely performed investigation to achieve the above object, and have eventually found that when a zeolite raw material is prepared so as to contain silica sol having specific properties or a specific structure at a specific ratio, the above object can be achieved, to complete the present invention.

That is, according to the present invention, a manufacturing method of a zeolite structure is provided as follows.

According to a first aspect of the present invention, a manufacturing method of a zeolite structure is provided, comprising: a mixing step of mixing a plurality of zeolite particles, an inorganic binding material which binds the zeolite particles to one another, and an organic binder, to prepare a zeolite raw material; a forming step of extruding the prepared zeolite raw material to obtain a formed zeolite article; and a firing step of firing the obtained formed zeolite article to prepare the zeolite structure, wherein the mixing step uses the inorganic binding material containing at least one type of silica sol selected from the group consisting of acid silica sol, silica sol containing silica particles coated with alumina, cationic silica sol, silica sol containing string-like silica particles, and silica sol containing silica particles having a shape where a plurality of spherical silica particles are tied one to the next, and a content ratio of silica particles contained in the silica sol selected from the group is from 10 to 30 mass% with respect to 100 mass% of the zeolite particles.

According to a second aspect, the manufacturing method of the zeolite structure according to the first aspect is provided, wherein the mixing step uses, as the inorganic binding material, an inorganic binding material further containing at least one type selected from the group consisting of alumina sol, titania sol, zirconia sol, ceria sol, boehmite, montmorillonite, hydrotalcite, basic aluminum chloride, hydraulic alumina, silicon resin, and water glass, to prepare the zeolite raw material.

According to a third aspect. the manufacturing method of the zeolite structure according to the first or second aspects is provided, wherein the mixing step uses the inorganic binding material so that a volume of the fired inorganic binding material is from 10 to 50 vol% with respect to a volume of the zeolite structure.

According to a fourth aspect, the manufacturing method of the zeolite structure according to any one of the first to third aspects is provided, wherein the mixing step uses, as zeolite particles of at least a part of the plurality of zeolite particles, particles made of at least one type of zeolite selected from the group consisting of ZSM-5 type zeolite, β-type zeolite, Y-type zeolite, mordenite type zeolite, and ferrierite type zeolite.

According to a fifth aspect, the manufacturing method of the zeolite structure according to any one of the first to fourth aspects is provided, wherein the mixing step uses, as zeolite particles of at least a part of the plurality of zeolite particles, particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

According to a sixth aspect, the manufacturing method of the zeolite structure according to any one of the first to fifth aspects is provided, wherein the forming step extrudes the zeolite raw material in a honeycomb shape including partition walls disposed to form a plurality of cells which become through channels of a fluid and extend from one end face to the other end face, to obtain the formed zeolite article.

In a manufacturing method of a zeolite structure of the present invention, an inorganic binding material includes at least one type of silica sol selected from the group consisting of acid silica sol, silica sol containing silica particles coated with alumina, cationic silica sol, silica sol containing string-like silica particles, and silica sol containing silica particles having a shape where a plurality of spherical silica particles are tied one to the next, and a content ratio of silica particles contained in the silica sol selected from the group is from 10 to 30 mass % with respect to 100 mass % of the zeolite particles. In consequence, it is possible to suppress mutual agglomeration of silica particles contained in silica sol, whereby it is possible to suppress decrease of binding points between silica particles and the zeolite particles. Therefore, a zeolite structure having an excellent mechanical strength can be manufactured. Further specifically, acid silica sol, silica sol containing silica particles coated with alumina and cationic silica sol contain silica particles having surface properties which are different from those of silica particles contained in heretofore used typical silica sol, whereby it is possible to suppress the mutual agglomeration of silica particles. Moreover, silica sol containing string-like silica particles and silica sol containing silica particles having a shape where a plurality of spherical silica particles are tied one to the next contain silica particles having a shape different from that of silica particles contained in heretofore used typical silica sol, whereby it is possible to suppress the mutual agglomeration of silica particles.

DETAILED DESCRIPTION OF THE INVENTION

Hereinafter, a configuration for carrying out the present invention will be described, but it should be understood that the present invention is not limited to the following embodiment, and modification, improvement and the like are appropriately added to the following embodiment based on knowledge of a person with ordinary skill in the art without departing from the scope of the present invention.

Figure 1:
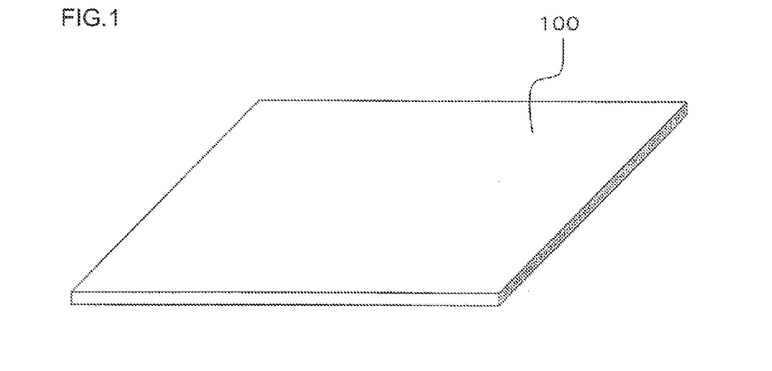
FIG. 1 is a perspective view schematically showing a zeolite structure manufactured by one embodiment of a manufacturing method of the zeolite structure of the present invention.

(1) Manufacturing Method of Zeolite Structure:

An embodiment of a manufacturing method of a zeolite structure of the present invention is a method of manufacturing a zeolite structure shown in FIG. 1. It is to be noted that FIG. 1 is a perspective view schematically showing the zeolite structure manufactured according to the embodiment of the manufacturing method of the zeolite structure of the present invention.

The manufacturing method of the zeolite structure of the present embodiment comprises a mixing step of mixing a plurality of zeolite particles, an inorganic binding material which binds the zeolite particles to one another, and an organic binder, to prepare a zeolite raw material; a forming step of extruding the prepared zeolite raw material to obtain a formed zeolite article; and a firing step of firing the obtained formed zeolite article to prepare the zeolite structure.

Moreover, in the manufacturing method of the zeolite structure of the present embodiment, the inorganic binding material which is used in the mixing step contains at least one type of silica sol selected from the group consisting of acid silica sol (hereinafter also referred to as "silica sol (1)"), silica sol containing silica particles coated with alumina (hereinafter also referred to as "silica sol (2)"), cationic silica sol (hereinafter also referred to as "silica sol (3)"), silica sol containing string-like silica particles (hereinafter also referred to as "silica sol (4)"), and silica sol containing silica particles having a shape where a plurality of spherical silica particles are tied one to the next (hereinafter also referred to as "silica sol (5)"), and a content ratio of silica particles contained in the silica sol selected from the above group is from 10 to 30 mass % with respect to 100 mass % of the zeolite particles.

When the zeolite structure is manufactured by such a manufacturing method, mutual agglomeration of silica particles contained in silica sol can be suppressed. In consequence, the zeolite structure having an excellent mechanical strength can be obtained. Hereinafter, steps of the manufacturing method of the zeolite structure of the present embodiment will be described in detail.

(1-1) Mixing Step:

As manufacturing method of the zeolite structure of the present embodiment, first, a plurality of zeolite particles, an inorganic binding material which binds the zeolite particles to one another, and an organic binder, are mixed to prepare a zeolite raw material. In this case, as described above, as the inorganic binding material, there is used an inorganic binding material containing at least one type of silica sol selected from the group consisting of silica sols (1) to (5), and containing silica particles in the at least one type of silica sol from 10 to 30 mass % with respect to 100 mass % of the zeolite particles, to prepare a zeolite raw material.

The zeolite raw material preferably contains water. The content ratio of water in the zeolite raw material is preferably from 30 to 70 mass % with respect to 100 mass % of the zeolite particles.

Moreover, the zeolite raw material may further include a dispersant and the like, in addition to the zeolite particles, the inorganic binding material and the organic binder. Examples of the dispersant include fatty acid, acrylic acid, sorbitan acid, and polyalcohol.

There is not any special restriction on a method of mixing components included in the zeolite raw material, and a heretofore known method can be applied. Examples of the method include a method of mixing the components in a dry system (i.e., without adding any water) for 10 to 30 minutes by use of a twin arm type kneader manufactured by Honda Machinery Works Co., Ltd., and then mixing and kneading the material for 20 to 60 minutes while further adding water to the mixed material to regulate viscosity of the mixed material.

Hereinafter, the zeolite particles, the inorganic binding material and the organic binder will be described in detail.

(1-1-1) Zeolite Particles:

The zeolite particles which are used in the manufacturing method of the zeolite structure of the present embodiment become aggregates of the zeolite structure. As to such zeolite particles, the inorganic binding material binds the zeolite particles to one another, to form one structure.

There is not any special restriction on the zeolite particles, and heretofore known zeolite particles can be used. There is not any special restriction on the zeolite particles, but there are preferably used particles made of at least one type of zeolite selected from the group consisting of ZSM-5 type zeolite, β-type zeolite, Y-type zeolite, mordenite type zeolite, and ferrierite type zeolite. Among these types of zeolite, ZSM-5 type zeolite, β-type zeolite and the like are preferable, because such type of zeolite has satisfactory purification performance and adsorption performance.

There is not any special restriction on the size of the zeolite particles, but the average particle diameter of the particles is, for example, preferably from 0.1 to 100 μm, further preferably from 0.5 to 50 μm and especially preferably from 0.7 to 20 μm. If the average particle diameter of the zeolite particles is less than 0.1 μm, heat resistance of the zeolite structure lowers sometimes. On the other hand, if the average particle diameter exceeds 100 μm, it may become difficult to obtain a formed zeolite article by extrusion forming.

It is to be noted that in the present description, "the average particle diameter" is a median diameter (d50) in a particle diameter distribution of particles (the zeolite particles, silica particles, etc.). It is to be noted that the average particle diameter is a value measured by a laser diffraction scattering process in conformity to JIS R1629. It is to be noted that during the measuring, it is possible to use a laser diffraction/scattering type particle size distribution measuring device ("LA-920" (trade name)) manufactured by Horiba, Ltd.

Zeolite particles of at least a part of a plurality of zeolite particles included in the zeolite raw material are preferably particles made of zeolite subjected to ion exchange between cations of zeolite and ions of at least one type of metal selected from the group consisting of copper, iron, nickel, zinc, manganese, cobalt, silver, palladium, indium, cerium, gallium, titanium and vanadium. When such zeolite particles are used, the zeolite structure having an excellent catalyst function can easily be manufactured. It is to be noted that an ion exchange treatment can be performed after the zeolite structure is prepared (a firing step). However, manufacturing steps are easily performed, and hence the zeolite particles are preferably subjected to an ion exchange treatment.

There is not any special restriction on an ion exchange amount between cations of zeolite and the metal ions, but the ion exchange amount is preferably from 0.3 to 2.0, further preferably from 0.7 to 1.5 and especially preferably from 0.9 to 1.2 at a molar ratio of a valence of the metal ions with respect to Al ions contained in zeolite. If the ion exchange amount is less than 0.3, the catalyst performance of the zeolite particles lowers. On the other hand, if the ion exchange amount exceeds 2.0, the catalyst performance of the zeolite particles is saturated, and further ion exchange unfavorably wastes metal resources, especially noble metal resources. It is to be noted that the ion exchange amount can be measured with, for example, an inductively coupled plasma mass analysis device ("SPQ9000" (trade name)) manufactured by Seiko Instruments, Inc.

Examples of a method of subjecting the zeolite particles or the zeolite structure to the ion exchange treatment include a method as follows.

First, a solution for ion exchange containing metal ions for the ion exchange (the solution containing the metal ions) is prepared, and the zeolite particles or the zeolite structure is immersed in this solution for ion exchange. Immersion time can appropriately be determined in accordance with the amount of the metal ions for the ion exchange or the like. Next, the zeolite particles or the zeolite structure is taken out of the solution for ion exchange, dried and calcinated, whereby the zeolite particles or the zeolite structure subjected to the ion exchange can be obtained. It is to be noted that drying conditions are preferably from 80 to 150° C. and from one to ten hours, and calcinating conditions are preferably from 400 to 600° C. and from one to ten hours.

As the solution for ion exchange in the method of subjecting the above zeolite particles or zeolite structure to the ion exchange treatment, for example, an aqueous solution of silver nitrate or silver acetate may be prepared, when the ion exchange is performed by using silver ions. Moreover, when the ion exchange is performed by using copper ions, an aqueous solution of copper acetate, copper sulfate or copper nitrate may be prepared. When the ion exchange is performed by using iron ions, an aqueous solution of iron sulfate or iron acetate may be prepared. It is to be noted that the concentration of the solution for ion exchange is preferably from 0.005 to 0.5 mol/L.

(1-1-2) Inorganic Binding Material:

The inorganic binding material is added to bind the above zeolite particles to one another.

The inorganic binding material which is used in the manufacturing method of the zeolite structure of the present embodiment contains at least one type of silica sol selected from the group consisting of acid silica sol (silica sol (1)), silica sol containing silica particles coated with alumina (silica sol (2)), cationic silica sol (silica sol (3)), silica sol containing string-like silica particles (silica sol (4)), and silica sol containing silica particles having a shape where a plurality of spherical silica particles are tied one to the next (silica sol (5)), and a content ratio of silica particles contained in the silica sol selected from the above group needs to be from 10 to 30 mass % with respect to 100 mass % of the zeolite particles. When such an inorganic binding material is used, the zeolite structure having an excellent mechanical strength can be manufactured. It is to be noted that "silica particles contained in the silica sol selected from the above group" is "silica particles contained in at least one type of silica sol selected from the group consisting of the above silica sols (1) to (5)".

Silica sol includes colloidal silica (hereinafter referred to simply as "silica particles") dispersed in a dispersion medium (water). Heretofore used typical silica sol is (alkaline) silica sol which has a spherical shape, is stabilized with sodium ions and is stable in an alkaline region. When silica sol is neutralized in the zeolite raw material showing acidity and shifts to a neutral region, silica particles mutually agglomerates. Therefore, binding points between silica particles and the zeolite particles decrease, and silica particles cannot sufficiently be bound to the zeolite particles. In consequence, the mechanical strength of the zeolite structure lowers.

Unlike heretofore used typical silica sol, the silica sols (1) to (5) which are used in the manufacturing method of the zeolite structure of the present embodiment are mixed with the zeolite particles, and are neutralized to shift to the neutral region, but the mutual agglomeration of silica particles can be suppressed, and hence the zeolite structure having an excellent mechanical strength can be obtained.

Moreover, in the zeolite raw material, the content ratio of silica particles contained in the silica sols (1) to (5) is from 10 to 30 mass %, preferably from 15 to 28 mass %, further preferably from 20 to 27 mass % and especially preferably from 23 to 25 mass % with respect to 100 mass % of the zeolite particles. If the content ratio of the above silica particles is less than 10 mass %, an effect due to the use of at least one type of silica sol selected from the group consisting of silica sols (1) to (5) is not sufficiently developed, and the strength of the zeolite structure lowers sometimes. On the other hand, if the content ratio of the above silica particles exceeds 30 mass %, together with silica particles contained in silica sol, a large amount of water (the dispersion medium) is added to the zeolite raw material. Therefore, there is a problem that with the decrease of the viscosity of the zeolite raw material, shape retention properties also lower, and it becomes difficult to extrusion-form the structure.

It is to be noted that in each of the silica sols (1) to (5), the content ratio of silica particles is preferably from 10 to 40 mass%, more preferably from 15 to 30 mass%, further preferably from 18 to 25 mass%, and especially preferably about 20 mass%. If the content ratio of silica particles in silica sol is less than 10 mass%, together with silica particles contained in silica sol, a large amount of water (the dispersion medium) is added to the zeolite raw material. Therefore, with the decrease of the viscosity of the zeolite raw material, the shape retention properties also lower, and the structure cannot be extrusion-formed sometimes. On the other hand, if the content ratio of silica particles in silica sol exceeds 40 mass%, the silica particles are sometimes mutually agglomerated.

[Acid Silica Sol (Silica Sol (1))]

Silica sol (1) is (acid) silica sol obtained by subjecting heretofore used typical silica sol to, for example, a cation exchange treatment, and is, accordingly, stable in an acid region. In the manufacturing method of the zeolite structure of the present embodiment, even when silica sol (1) is mixed with the zeolite particles showing acidity, silica sol (1) is stable in the acid region, and the agglomeration of silica particles is suppressed, whereby the mechanical strength of the zeolite structure can be improved.

The pH of silica sol (1) is preferably from 1.0 to 4.0, more preferably from 1.5 to 3.0, and especially preferably from 2.0 to 2.5.

There is not any special restriction on the shape of silica particles contained in silica sol (1), but a spherical shape is preferable.

The average particle diameter of silica particles contained in silica sol (1) is preferably from 5 to 80 nm, more preferably from 8 to 60 nm, further preferably from 9 to 35 nm, and especially preferably from 10 to 20 nm. If the average particle diameter of silica particles is less than 5 nm, the particles are excessively small, and stable silica sol cannot be obtained sometimes. On the other hand, if the average particle diameter of silica particles exceeds 80 nm, as compared with silica sol containing silica particles having the average particle diameter in the above preferable range, the number of silica particles contained in silica sol (1) decreases. In consequence, it is not possible to bind sufficiently the zeolite particles to one another, and the strength of the zeolite structure lowers sometimes.

Specific examples of silica sol (1) include "SNOWTEX O" (trade name), "SNOWTEX OXS" (trade name), "SNOWTEX OS" (trade name), "SNOWTEX O-40" (trade name), and "SNOWTEX OL" (trade name) manufactured by Nissan Chemical Industries, Ltd. Among these silica sols, "SNOWTEX O" (trade name) and "SNOWTEX OS" (trade name) manufactured by Nissan Chemical Industries, Ltd. are preferable, because the average particle diameter of silica particles is a preferable size.

[Silica Sol Containing Silica Particles Coated with Alumina (Silica Sol (2))]

Silica sol (2) is obtained by coating, with alumina, silica particles contained in heretofore used typical silica sol, and is comparatively stable even in a neutral region. In the manufacturing method of the zeolite structure of the present embodiment, even when silica sol (2) is mixed with the zeolite particles showing acidity, and is neutralized to shift to the neutral region, silica sol (2) is comparatively stable even in the neutral region, and the agglomeration of silica particles is suppressed, whereby the mechanical strength of the zeolite structure can be improved.

The pH of silica sol (2) is preferably from 2.0 to 10.5, more preferably from 2.0 to 5.0, and especially preferably from 2.0 to 2.5. If the pH of silica sol (2) is less than 2.0, silica particles contained in silica sol (2) is unstable, and hence silica particles are mutually agglomerated. On the other hand, if the pH of silica sol (2) exceeds 10.5, silica particles contained in silica sol (2) is dissolved sometimes.

There is not any special restriction on the shape of silica particles contained in silica sol (2), but a spherical shape is preferable.

The average particle diameter of silica particles contained in silica sol (2) is preferably from 5 to 80 nm, more preferably from 8 to 60 nm, further preferably from 9 to 35 nm, and especially preferably from 10 to 20 nm. If the average particle diameter of silica particles is less than 5 nm, the particles are excessively small, and hence stable silica sol cannot be obtained sometimes. On the other hand, if the average particle diameter of silica particles exceeds 80 nm, as compared with silica sol containing silica particles having the average particle diameter in the above preferable range, the number of silica particles contained in silica sol (2) decreases. In consequence, it is not possible to bind sufficiently the zeolite particles to one another, and the strength of the zeolite structure lowers sometimes.

Specific examples of silica sol (2) include "SNOWTEX C" (trade name) and "SNOWTEX CM" (trade name) manufactured by Nissan Chemical Industries, Ltd. Among these silica sols, "SNOWTEX C" (trade name) manufactured by Nissan Chemical Industries, Ltd. is preferable, because the average particle diameter of silica particles is small, and the obtained zeolite structure has a high strength.

[Cationic Silica Sol (Silica Sol (3))]

Silica sol (3) is obtained by bonding metal ions to the surface of silica particles contained in heretofore used typical silica sol. In the manufacturing method of the zeolite structure of the present embodiment, when silica sol (3) is used, the agglomeration of silica particles is suppressed, and hence the mechanical strength of the zeolite structure can be improved.

The pH of silica sol (3) is preferably from 2.0 to 10.5, more preferably from 2.0 to 5.0, and especially preferably from 2.0 to 2.5. If the pH of silica sol (3) is less than 2.0, silica particles contained in silica sol (3) is unstable, and hence silica particles are mutually agglomerated. On the other hand, if the pH of silica sol (3) exceeds 10.5, silica particles contained in silica sol (3) is dissolved sometimes.

There is not any special restriction on the shape of silica particles contained in silica sol (3), but a spherical shape is preferable.

The average particle diameter of silica particles contained in silica sol (3) is preferably from 5 to 80 nm, more preferably from 8 to 60 nm, further preferably from 9 to 35 nm, and especially preferably from 10 to 20 nm. If the average particle diameter of silica particles is less than 5 nm, the particles are excessively small, and hence stable silica sol cannot be obtained sometimes. On the other hand, if the average particle diameter of silica particles exceeds 80 nm, as compared with silica sol containing silica particles having the average particle diameter in the above preferable range, the number of silica particles contained in silica sol (3) decreases. In consequence, it is not possible to bind sufficiently the zeolite particles to one another, and the strength of the zeolite structure lowers sometimes.

Specific examples of silica sol (3) include "SNOWTEX AK" (trade name) manufactured by Nissan Chemical Industries, Ltd.

[Silica Sol Containing String-Like Silica Particles (Silica Sol (4))]

Silica sol (4) is silica sol containing string-like silica particles. Here, a "string-like" shape is "a shape where particles having a uniform thickness elongate". That is, the "string-like" shape is "any shape as long as the particles having a uniform thickness elongate, and the shape may be linear, bent, or branched, or may form a ring".

In silica sol (4) having such a shape, the mutual agglomeration of silica particles can be suppressed even in any liquid (pH) region. Therefore, when silica sol (4) is used in the manufacturing method of the zeolite structure of the present embodiment, the mechanical strength of the zeolite structure can be improved.

There is not any special restriction on the pH of silica sol (4), and the pH can appropriately be adjusted by performing a cation exchange treatment, or adding an alkaline aqueous solution or the like, and the pH is preferably from 2.0 to 11.0, further preferably from 2.0 to 5.0, and especially preferably from 2.0 to 2.5. If the pH of silica sol (4) is less than 2.0, silica particles contained in silica sol (4) is unstable, and hence silica particles are mutually agglomerated. On the other hand, if the pH of silica sol (4) exceeds 11.0, silica particles contained in silica sol (4) is dissolved sometimes.

The particle diameters of silica particles contained in silica sol (4) is preferably from 30 to 250 nm, more preferably from 40 to 100 nm, and especially preferably from 50 to 80 nm. If the particle diameters of silica particles are less than 30 nm, the particles are excessively small, and hence stable silica sol cannot be obtained sometimes. On the other hand, if the particle diameters of silica particles exceed 250 nm, as compared with silica sol containing silica particles having an average particle diameter in the above preferable range, the number of silica particles contained in silica sol (4) decreases. In consequence, it is not possible to bind sufficiently the zeolite particles to one another, and the strength of the zeolite structure lowers sometimes. It is to be noted that "the particle diameters" of silica particles are values measured by a dynamic light scattering process.

Specific examples of silica sol (4) include "SNOWTEX UP" (trade name) and "SNOWTEX OUP" (trade name) manufactured by Nissan Chemical Industries, Ltd. Among these silica sols, "SNOWTEX OUP" (trade name) manufactured by Nissan Chemical Industries, Ltd. is preferable, because this is acidity stable type silica sol.

[Silica Sol Containing Bead-Like Silica Particles (Silica Sol (5))]

Silica sol (5) contains silica particles having a shape where a plurality of spherical silica particles are tied one to the next. Here, "the shape where the plurality of spherical silica particles are tied one to the next" is "a shape where spherical silica particles corresponding to bead spheres and silica particles of a joining portion corresponding to a bead string are alternately bound, and the joining portion is constricted like a dumbbell". This shape can be referred to as a "pearl-necklace-like" shape. Moreover, the plurality of spherical silica particles may linearly be tied one to the next, may be bent and tied one to the next, may be branched and tied one to the next, or may be tied one to the next in a ring-like shape. It is to be noted that hereinafter, "the shape where a plurality of spherical silica particles are tied one to the next " will also be referred to simply as "bead-like".

There is not any special restriction on the average particle diameter of spherical silica particles corresponding to "the bead spheres" of bead-like silica particles contained in silica sol (5), but the average particle diameter is preferably from 10 to 50 nm, and especially preferably from 10 to 20 nm. Moreover, the particle diameters of bead-like silica particles corresponding to "bead" lengths are preferably from 80 to 150 nm, and especially preferably from 80 to 120 nm. That is, silica sol (5) preferably contains bead-like silica particles having a shape where 5 to 10 spherical silica particles having an average particle diameter of 10 to 18 nm are tied one to the next.

In silica sol (5), the mutual agglomeration of silica particles can be suppressed even in any liquid (pH) region. Moreover, when such silica sol is dried, a gel having large gaps can be formed. Therefore, when silica sol (5) is used in the manufacturing method of the zeolite structure of the present embodiment, the mechanical strength of the zeolite structure can be improved. Moreover, when the zeolite structure is used as, for example, an exhaust gas purifying device, silica particles as a binding material has large gaps, thereby enhancing gas diffusion properties. In consequence, a purification performance can be improved.

There is not any special restriction on the pH of silica sol (5), and the pH can appropriately be adjusted, for example, by performing a cation ion exchange treatment, or adding an alkaline aqueous solution or the like, but the pH is preferably from 2.0 to 11.0, further preferably from 2.0 to 5.0, and especially preferably from 2.0 to 2.5. If the pH of silica sol (5) is less than 2.0, silica particles contained in silica sol (5) is unstable, and hence silica particles are mutually agglomerated. On the other hand, if the pH of silica sol (5) exceeds 11.0, silica particles contained in silica sol (5) is dissolved sometimes.

Specific examples of silica sol (5) include "SNOWTEX PS-S" (trade name), "SNOWTEX PS-M" (trade name), and "SNOWTEX PS-SO" (trade name) manufactured by Nissan Chemical Industries, Ltd. Among these silica sols, "SNOWTEX PS-SO" (trade name) manufactured by Nissan Chemical Industries, Ltd. is preferable, because this silica sol is acidity stable type silica sol.

As an inorganic binding material in the manufacturing method of the zeolite structure of the present embodiment, there can be used an inorganic binding material which further includes, in addition to the above silica sol, at least one type selected from the group consisting of alumina sol, titania sol, zirconia sol, ceria sol, boehmite, montmorillonite, hydrotalcite, basic aluminum chloride, hydraulic alumina, silicon resin, and water glass.

In the zeolite raw material, the content of the inorganic binding material is such an amount that the volume of the fired inorganic binding material with respect to the volume of the zeolite structure is from 10 to 50 vol %, further preferably from 10 to 30 vol %, and especially preferably from 15 to 25 vol %. When the content of the inorganic binding material is the amount corresponding to a volume which is less than 10 vol % with respect to the volume of the zeolite structure, the amount of the inorganic binding material is excessively small, and it becomes difficult to satisfactorily bind the zeolite particles to one another. On the other hand, when the content of the inorganic binding material is an amount corresponding to a volume which exceeds 50 vol % with respect to the volume of the zeolite structure, the relative amount of the zeolite particles becomes small. In consequence, the purification performance of the zeolite structure lowers sometimes.

It is to be noted that the volume (the true volume) "V" of the zeolite structure is a value obtained by equation (1) as follows.

$$V = V_Z + V_{B2} \quad (1),$$

V: the volume (the true volume) of the zeolite structure;
$V_Z$: the volume of the zeolite particles; and
$V_{B2}$: the volume of the (fired) inorganic binding material.

"$V_Z$: the volume of the zeolite particles" in the above equation (1) is a value obtained by equation (2) as follows.

$$V_Z = M_Z / D_Z \quad (2),$$

$V_Z$: the volume of the zeolite particles;
$M_Z$: the mass of the zeolite particles; and
$D_Z$: the density of zeolite (1.85 g/cm$^3$).

"$V_{B2}$: the volume of the (fired) inorganic binding material" in the above equation (1) is a value obtained by equation (3) as follows. It is to be noted that "$M_{B2}$: the mass of the fired inorganic binding material" in equation (3) is a value obtained by equation (4) as follows. "$D_{B2}$: the density of the fired inorganic binding material" in equation (3) and "$m_B$: a mass change ratio of the inorganic binding material before/after fired" in equation (4) are values beforehand obtained through firing only by use of the inorganic binding material.

$$V_{B2} = M_{B2} / D_{B2} \quad (3),$$

$V_{B2}$: the volume of the fired inorganic binding material;
$M_{B2}$: the mass of the fired inorganic binding material; and
$D_{B2}$: the density of the fired inorganic binding material.

$$M_{B2} = M_{B1} \times m_B \quad (4)$$

$M_{B2}$: the mass of the fired inorganic binding material;
$M_{B1}$: the mass of the inorganic binding material before fired; and
$m_B$: the mass change ratio of the inorganic binding material before/after fired.

(1-1-3) Organic Binder:

An organic binder is added to improve forming properties or shape retention properties of a formed zeolite article described later.

Examples of the organic binder which is used in the manufacturing method of the zeolite structure of the present embodiment include methylcellulose, hydroxypropyl methylcellulose, hydroxypropyl ethylcellulose, hydroxyethyl cellulose, hydroxyethyl methylcellulose, carboxymethyl cellulose, and polyvinyl alcohol. Among these binders, hydroxypropyl methylcellulose, and methylcellulose are especially preferable, because cracks are not easily generated during drying.

In the zeolite raw material, the content ratio of the organic binder is preferably from 1 to 20 mass %, further preferably from 3 to 10 mass %, and especially preferably from 3 to 6 mass % with respect to 100 mass % of the total of the zeolite particles and the inorganic binding material. If the content ratio of the organic binder is less than 1 mass %, the viscosity of the formed zeolite article is excessively high, and the formed zeolite article cannot be extrusion-formed sometimes. On the other hand, if the content ratio of the organic binder exceeds 20 mass %, "the porosity" of the zeolite structure becomes high, and the strength lowers sometimes.

(1-2) Forming Step:

In the manufacturing method of the zeolite structure of the present embodiment, the zeolite raw material prepared in the above mixing step is extruded in a predetermined shape to obtain the formed zeolite article.

Figure 3:
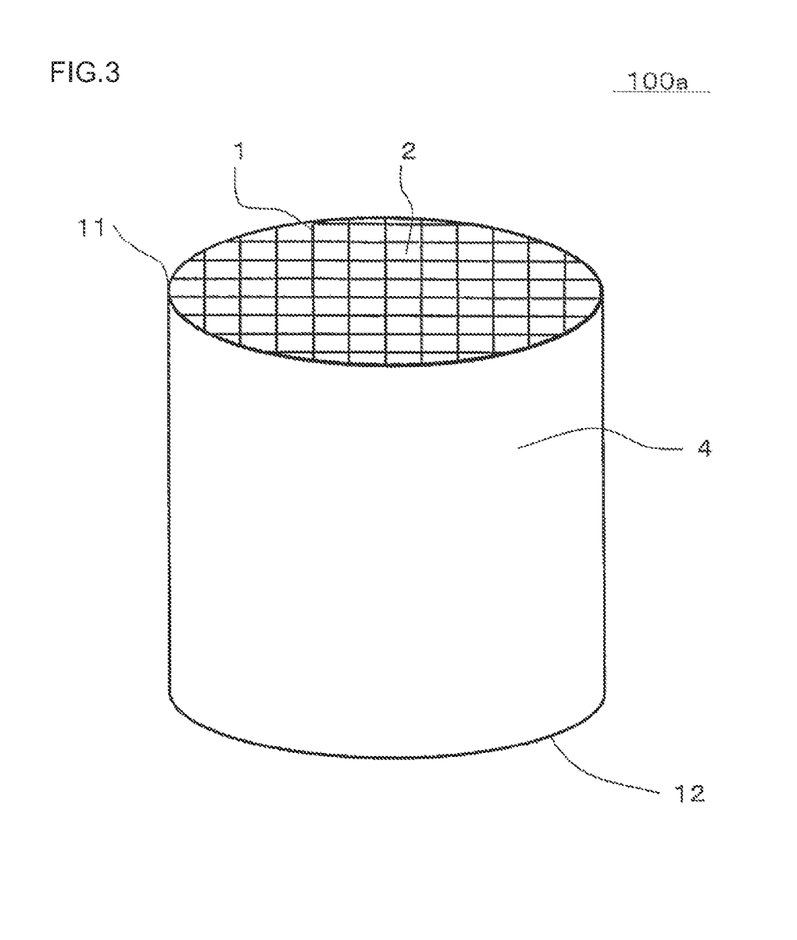
FIG. 3 is a perspective view schematically showing a zeolite structure manufactured by another embodiment of the manufacturing method of the zeolite structure of the present invention.

There is not any special restriction on the shape of the extrusion-formed zeolite article, as long as the article can be utilized for purification or separation of a gas. Examples of the specific shape include a film-like shape, a plate-like shape shown in FIG. 1, and a tubular shape. As shown in FIG. 3, the shape may be, for example, a honeycomb shape including partition walls 1 disposed to form a plurality of cells 2 which become through channels of a fluid and extend from one end face to the other end face. It is to be noted that FIG. 3 is a perspective view schematically showing the zeolite structure manufactured by another embodiment of the manufacturing method of the zeolite structure of the present invention.

When the formed zeolite article is formed in a honeycomb shape, the zeolite raw material is preferably kneaded to obtain a columnar formed article, and the columnar formed article is extruded by using a die which imparts a predetermined honeycomb shape, thereby obtaining the formed zeolite article having the honeycomb shape. There is not any special restriction on a method of obtaining the columnar formed article, and examples of the method include methods using a kneader, a vacuum clay kneader and the like. Moreover, as a material of the die which is used for the extrusion forming, a metal which does not easily wear is preferably used.

When the formed zeolite article is formed in the honeycomb shape, as shown in FIG. 3, an outer peripheral wall 4 is preferably disposed to surround the whole outer periphery of the partition walls 1. The outer peripheral wall 4 may be extrusion-formed integrally with the partition walls 1. Alternatively, the outer peripheral wall 4 may be formed by obtaining the formed zeolite article, processing an outer peripheral portion of the formed zeolite article in a desirable shape, and coating the processed outer peripheral portion. It is to be noted that a raw material of the outer peripheral wall 4 which is used during the coating does not necessarily have to be the same raw material as that of the partition walls 1. However, if physical properties such as heat resistance and thermal expansion coefficient of the material of the outer peripheral portion are noticeably different from those of the material of the partition walls 1, a problem such as breakdown of the partition walls 1 occurs sometimes. Therefore, mainly the same raw material or raw materials having equivalent physical properties is preferably used.

(1-3) Firing Step:

In the manufacturing method of the zeolite structure of the present embodiment, the formed zeolite article obtained by the above forming step is fired to prepare the zeolite structure.

There is not any special restriction on a method of firing the formed zeolite article, and the article can be fired by using an electric furnace, a gas furnace or the like. As firing conditions, the article is preferably heated in the atmosphere for one to ten hours. Moreover, a firing temperature is preferably from 500 to 750° C., and further preferably from 550 to 700° C. If the firing temperature is less than 500° C., the strength of the zeolite structure lowers sometimes. On the other hand, if the firing temperature exceeds 750° C., the purification performance of zeolite lowers sometimes.

When the zeolite structure having the honeycomb shape is prepared, the formed zeolite article is preferably dried before fired. There is not any special restriction on a drying method, and examples of the method include electromagnetic heating systems such as microwave heating drying and high frequency inductive heating drying, and external heating systems such as hot air drying and superheated steam drying. Among these methods, there is a method of drying the article to remove a predetermined amount of water by the electromagnetic heating system and then drying the article to remove the remaining water by the external heating system, and this method is preferable in that the whole formed article can quickly and uniformly be dried so as to prevent cracks from being generated.

Moreover, when the zeolite structure having the honeycomb shape is prepared, before firing (finally firing) the formed zeolite article, the formed zeolite article is preferably calcinated. The article is calcinated to degrease the article. There is not any special restriction on this method, as long as organic substances (the organic binder, the dispersant, etc.) can be removed from the formed zeolite article. As calcinating conditions, the article is preferably heated at about 200 to 500° C. in an oxidizing atmosphere for about one to 20 hours.

It is to be noted that in the mixing step, when the zeolite particles subjected to the ion exchange treatment are not used as the zeolite particles, the formed and fired zeolite article (the zeolite structure) may be subjected to ion exchange between cations of zeolite and metal ions.

When the above steps are carried out, the zeolite structure can be obtained. Hereinafter, the zeolite structure manufactured by the manufacturing method of the zeolite structure of the present invention will be described in detail.

Figure 2:
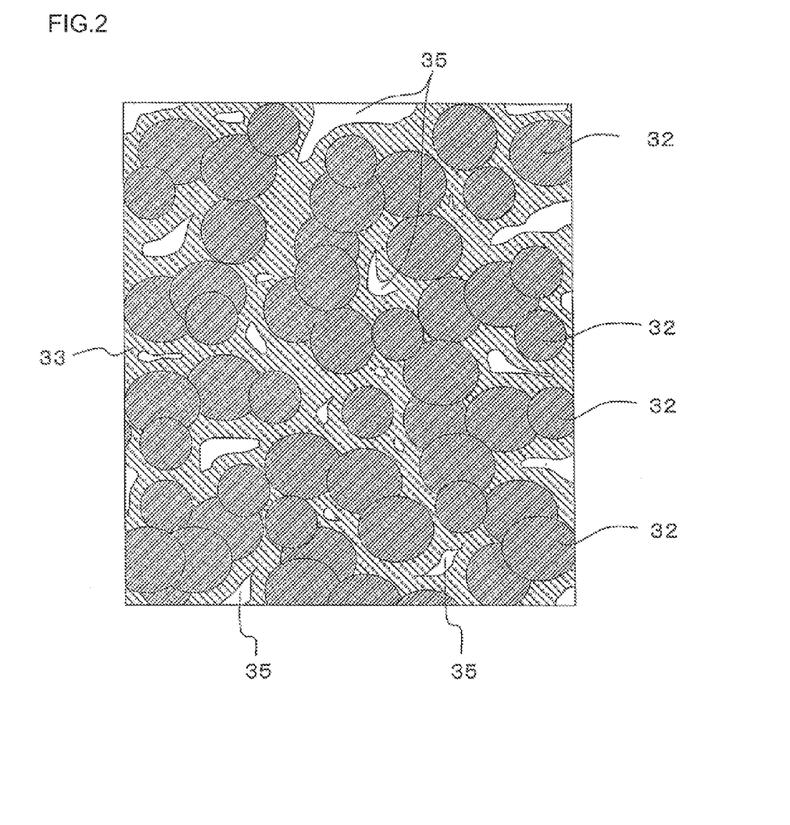
FIG. 2 is an enlarged view schematically showing a binding state between zeolite particles and an inorganic binding material in the section of the zeolite structure of FIG. 1 which is vertical to the surface thereof.

(2) Zeolite Structure:

As shown in FIG. 2, the zeolite structure manufactured by the manufacturing method of the zeolite structure of the present invention is constituted of a porous article in which zeolite particles 32 are bound with an inorganic binding material 33. The porous article has a number of "pores" 35. It is to be noted that FIG. 2 is an enlarged view schematically showing a binding state between the zeolite particles and the inorganic binding material in the section of the zeolite structure of FIG. 1 which is vertical to the surface thereof. Moreover, in the zeolite structure manufactured by the manufacturing method of the zeolite structure of the present invention, zeolite itself (zeolite particles themselves) has "fine pores" as a crystal structure. In the present description, as to properties concerning "the pores" of the zeolite structure, "pore porosity", "pore diameters" and the like are described, and as to properties concerning "fine pores" of zeolite (the zeolite particles), "fine pore porosity", "fine pore diameters" and the like are described, and distinguished.

"The fine porosity" and "the fine pore diameters" of zeolite (the zeolite particles) are values inherent in the type of zeolite. For example, ZSM-5 type zeolite has fine pores of oxygen ten-membered rings, and fine pore diameters are from about 0.5 to 0.6 nm. Moreover, β-type zeolite has fine pores of oxygen twelve-membered rings, and fine pore diameters are from about 0.5 to 0.75 nm.

"The pore porosity" of the zeolite structure manufactured by the manufacturing method of the zeolite structure of the present invention is preferably from 20 to 60%, further preferably from 30 to 50%, and especially preferably from 30 to 40%. If "the pore porosity" of the zeolite structure is less than 20%, an area where a fluid to be purified (e.g., an exhaust gas or the like discharged from an engine for a car or the like) comes in contact with zeolite becomes small, and hence the purification performance of the zeolite structure lowers sometimes. On the other hand, if "the pore porosity" of the zeolite structure exceeds 60%, the strength of the zeolite structure lowers sometimes.

It is to be noted that "the pore porosity" of the zeolite structure is a value calculated in the following equation (5) by use of an pore volume per unit mass of pores having an average pore diameter of 3 nm to 180 μm measured by mercury intrusion method, and true density of the fired zeolite honeycomb article.

$$\text{Pore porosity} = \text{pore volume}/(\text{pore volume} + 1/\text{true density of fired zeolite honeycomb article}) \times 100 \quad (5)$$

Additionally, in the above equation (5), the pore volume is a value measured with a fully automatic multifunctional mercury porosimeter "PoreMaster 60GT (trade name)" manufactured by Quantachrome Co. Moreover, as to the true density of the fired zeolite honeycomb article, the true density of zeolite (the zeolite particles) is 1.85 g/cm$^3$, and the true density of plate-like particles (a filler) is a value determined in accordance with a material thereof. Furthermore, the true density of the inorganic binding material is a value measured with a dry type automatic densimeter "Accupyc 1330 (trade name)" manufactured by Micromeritics, Inc.

There is not any special restriction on the shape of the zeolite article manufactured by the manufacturing method of the zeolite structure of the present invention as described above, and the article may have, for example, a film-like shape, a plate-like shape shown in FIG. 1, or a tubular shape. As shown in FIG. 3, the shape may be a honeycomb shape including partition walls disposed to form a plurality of cells which become through channels of a fluid and extend from one end face to the other end face. Among these shapes, for example, the honeycomb shape is preferable from a viewpoint that an exhaust gas discharged from an engine for a car or the like is efficiently purified.

When the zeolite structure having the honeycomb shape is used in place of a honeycomb structure including a honeycomb carrier which is made of a heretofore used ceramic material such as cordierite and onto which a catalyst is loaded, a pressure loss can remarkably be lowered. Furthermore, more catalysts can be loaded onto the zeolite structure, and hence the purification performance can further be enhanced. Moreover, the zeolite structure manufactured by the manufacturing method of the zeolite structure of the present invention has a high strength, and breakdown or deformation caused by vibration or the like does not easily occur. The zeolite structure can be installed and used not only in a stational purifying device which purifies an exhaust gas from an engine for a construction machine, an industrial stational engine, or a burning apparatus but also in an exhaust system of a car.

When the zeolite structure is formed in a honeycomb shape, an area of a section of the structure which is orthogonal to a cell extending direction is preferably from 300 to 200,000 mm$^2$. If the sectional area of the structure is less than 300 mm$^2$, an area, where the exhaust gas can be treated, becomes small. Additionally, the pressure loss becomes high. On the other hand, if the sectional area exceeds 200,000 mm$^2$, the strength of the zeolite structure lowers sometimes.

When the zeolite structure is formed in the honeycomb shape, there is not any special restriction on the shape of the cell (i.e., the shape of the cell in the section of the structure which is orthogonal to the cell extending direction), and examples of the shape include a triangular shape, a quadrangular shape, a hexagonal shape, an octagonal shape, a round shape, and a combination of these shapes.

When the zeolite structure is formed in the honeycomb shape, the thicknesses of the partition walls are preferably from 50 μm to 2 mm, and further preferably from 100 μm to 1 mm. If the thicknesses of the partition walls are less than 50

µm, the strength of the zeolite structure lowers sometimes. On the other hand, if the thicknesses of the partition walls exceed 2 mm, the pressure loss during circulation of a fluid such as the exhaust gas through the zeolite structure increases sometimes. Moreover, the thickness of the outer peripheral wall constituting the outermost periphery of the zeolite structure having the honeycomb shape is preferably 10 mm or less. If the thickness of the outer peripheral wall exceeds 10 mm, the area to perform the exhaust gas purification treatment becomes inadequate.

When the zeolite structure is formed in the honeycomb shape, there is not any special restriction on a cell density, but the cell density is preferably from 7.8 to 155.0 cells/cm$^2$, and further preferably from 31.0 to 93.0 cells/cm$^2$. If the cell density exceeds 155.0 cells/cm$^2$, the pressure loss during the circulation of a fluid such as the exhaust gas through the zeolite structure may become large. On the other hand, if the cell density is less than 7.8 cells/cm$^2$, the area to perform the exhaust gas purification treatment may become inadequate.

When the zeolite structure is formed in the honeycomb shape, there is not any special restriction on the whole shape of the structure, and examples of the shape include a cylindrical shape, an oval shape and another desirable shape. Moreover, as to the size of the zeolite structure, when the zeolite structure has, for example, a cylindrical shape, the diameter of the bottom surface of the structure is preferably from 20 to 500 mm, and further preferably from 70 to 300 mm. Moreover, the length of the zeolite structure in the cell extending direction is preferably from 10 to 500 mm, and further preferably from 30 to 300 mm.

EXAMPLES

Hereinafter, the present invention will specifically be described with respect to examples, but the present invention is not limited to these examples.

Example 1

As zeolite particles, there was used zeolite particles made of β-type zeolite, subjected to 3 mass % ion exchange between cations of zeolite and copper ions and having an average particle diameter of 0.7 µm; as an inorganic binding material, there was used acid silica sol having a silica content ratio of 20 mass % (silica sol (1): "SNOWTEX O" (trade name) manufactured by Nissan Chemical Industries, Ltd.); and as an organic binder, there was used hydroxypropyl methylcellulose (HPMC). Table 1 shows various properties of used acid silica sol.

Tree thousand and five hundred g of the zeolite particles, 3000 g of the above acid silica sol and 210 g of the above HPMC were mixed in a dry system for ten minutes by use of a twin arm type kneader manufactured by Honda Machinery Works Co., Ltd. While further adding water to regulate viscosity, the material was mixed and kneaded for 40 minutes, to obtain a kneaded substance of zeolite particles (a zeolite raw material). Table 2 indicates a blending prescription of the zeolite raw material, and a content ratio of silica particles with respect to 100 mass % of the zeolite particles (in Table 2, "silica content ratio (mass %)" is described). Moreover, Table 2 indicates a ratio of a volume of the fired inorganic binding material used in Example 1 with respect to 100 vol % of an obtained zeolite structure (in Table 2, "the volume ratio of the fired inorganic binding material (vol %)").

The obtained kneaded zeolite substance was extruded with a continuous kneading vacuum extrusion forming machine manufactured by Honda Machinery Works Co., Ltd., in a plate-like shape having a width of 25 mm and a thickness of 5 mm, thereby obtaining a formed zeolite article. The obtained formed zeolite article was dried at 80° C. in a hot air drier for 12 hours, degreased at 450° C. in a firing furnace for five hours, and fired at 700° C. for four hours, to obtain the zeolite structure.

It is to be noted that an average particle diameter of the zeolite particles is a median diameter (d50) in a particle diameter distribution of the zeolite particles. The diameter was measured by a laser diffraction scattering process in conformity to JIS R1629.

Moreover, the obtained zeolite structure was subjected to a four-point bending test in conformity to JIS R1601, and the bending strength of the zeolite structure was measured. Table 2 indicates the measurement result of the bending strength ("bending strength (MPa)").

TABLE 1

| Silica sol | | Silica content ratio | | | Particle dia. |
|---|---|---|---|---|---|
| Type | Trade name | (mass %) | pH | Shape | (nm) |
| Silica sol (1) (acid) | SNOWTEX O | 20 | 2.0~4.0 | Spherical | 10~20 |
| Silica sol (2) (coated with alumina) | SNOWTEX C | 20 | 8.5~9.0 | Spherical | 10~20 |
| Silica sol (3) (cationic) | SNOWTEX AK | 19 | 4.0~6.0 | Spherical | 10~20 |
| Silica sol (4) (string-like) | SNOWTEX UP | 20 | 9.0~10.5 | String-like | 40~100 |
| Silica sol (5) (bead-like) | SNOWTEX PS-S | 19 | 9.5~11.0 | Bead-like | 80~120 |
| Silica sol (6) (spherical and alkaline) | SNOWTEX 20 | 20 | 9.5~10.0 | Spherical | 10~20 |

TABLE 2

| | Zeolite particle Used amount (g) | Silica sol Type | Silica sol Used amount (g) | Silica sol Silica content (g) | Boehmite Used amount (g) | HPMC Used amount (g) | Silica content ratio (mass %) | Volume ratio of fired inorganic binding material (mass %) | Evaluation Bending strength (MPa) |
|---|---|---|---|---|---|---|---|---|---|
| Example 1 | 3500 | Silica sol (1) | 3000 | 600 | — | 210 | 17 | 25 | 1.6 |
| Example 2 | 3500 | Silica sol (2) | 3000 | 600 | — | 210 | 17 | 25 | 1.8 |
| Example 3 | 3500 | Silica sol (3) | 3000 | 570 | — | 210 | 16 | 25 | 2.3 |
| Example 4 | 3500 | Silica sol (4) | 3000 | 600 | — | 210 | 17 | 25 | 2.1 |
| Example 5 | 3500 | Silica sol (5) | 3000 | 570 | — | 210 | 16 | 25 | 2.0 |
| Example 6 | 3500 | Silica sol (4) | 4500 | 900 | — | 350 | 26 | 33 | 3.2 |
| Example 7 | 3500 | Silica sol (4) | 1800 | 360 | — | 210 | 10 | 16 | 1.1 |
| Example 8 | 3500 | Silica sol (4) | 4500 | 900 | 800 | 350 | 26 | 37 | 3.8 |
| Comparative Example 1 | 3500 | Silica sol (6) | 1800 | 360 | — | 210 | 10 | 16 | 0.6 |
| Comparative Example 2 | 3500 | Silica sol (4) | 1400 | 280 | — | 210 | 8 | 13 | 0.7 |
| Comparative Example 3 | 3500 | Silica sol (4) | 6100 | 1220 | — | 350 | 35 | 40 | Cannot be formed |

Example 2

A zeolite structure was obtained in the same manner as in Example 1 except that as an inorganic binding material, 3000 g of silica sol having a silica content ratio of 20 mass % and containing silica particles coated with alumina (silica sol (2): "SNOWTEX C" (trade name) manufactured by Nissan Chemical Industries, Ltd.) was used. A bending strength of the obtained zeolite structure was measured. The results are shown in Table 2.

Example 3

A zeolite structure was obtained in the same manner as in Example 1 except that as an inorganic binding material, 3000 g of cationic silica sol having a silica content ratio of 19 mass % (silica sol (3): "SNOWTEX AK" (trade name) manufactured by Nissan Chemical Industries, Ltd.) was used. A bending strength of the obtained zeolite structure was measured. The results are shown in Table 2.

Example 4

A zeolite structure was obtained in the same manner as in Example 1 except that as an inorganic binding material, 3000 g of silica sol having a silica content ratio of 20 mass % and containing string-like silica particles (silica sol (4): "SNOWTEX UP" (trade name) manufactured by Nissan Chemical Industries, Ltd.) was used. A bending strength of the obtained zeolite structure was measured. The results are shown in Table 2.

Example 5

A zeolite structure was obtained in the same manner as in Example 1 except that as an inorganic binding material, 3000 g of silica sol having a silica content ratio of 19 mass % and containing bead-like silica particles (silica sol (5): "SNOWTEX PS-S" (trade name) manufactured by Nissan Chemical Industries, Ltd.) was used. A bending strength of the obtained zeolite structure was measured. The results are shown in Table 2.

Example 6

A zeolite structure was obtained in the same manner as in Example 1 except that as an inorganic binding material, 4500 g of the above silica sol (4) was used, and as an organic binder, 350 g of the above HPMC was used. A bending strength of the obtained zeolite structure was measured. The results are shown in Table 2.

Example 7

A zeolite structure was obtained in the same manner as in Example 1 except that as an inorganic binding material, 1800 g of the above silica sol (4) was used. A bending strength of the obtained zeolite structure was measured. The results are shown in Table 2.

Example 8

A zeolite structure was obtained in the same manner as in Example 1 except that as an inorganic binding material, 4500 g of the above silica sol (4) and 800 g of boehmite having a specific surface area of 130 m²/g were used, and as an organic binder, 350 g of the above HPMC was used. A bending strength of the obtained zeolite structure was measured. The results are shown in Table 2.

It is to be noted that as the specific surface area, BET specific surface area was measured with a flow type specific surface area measuring device: "FlowSorb-2300 (trade name)" manufactured by Micromeritics, Inc. after a sample pretreatment where a sample was held at 200° C. for ten minutes.

Comparative Example 1

A zeolite structure was obtained in the same manner as in Example 1 except that as an inorganic binding material, there was used 1800 g of alkaline silica sol having a silica content ratio of 20 mass % and containing spherical silica particles (silica sol (6): "SNOWTEX 20" (trade name) manufactured by Nissan Chemical Industries, Ltd. A bending strength of the obtained zeolite structure was measured. The results are shown in Table 2.

Comparative Example 2

A zeolite structure was obtained in the same manner as in Example 1 except that as an inorganic binding material, 1400 g of the above silica sol (4) was used. A bending strength of the obtained zeolite structure was measured. The results are shown in Table 2.

Comparative Example 3

A zeolite raw material was prepared in the same manner as in Example 1 except that as an inorganic binding material, 6100 g of the above silica sol (4) was used, and as an organic binder, 350 g of the above HPMC was used.

As evidenced by Table 2, as the inorganic binding material, there was used one type of silica sol selected from the group consisting of acid silica sol, silica sol containing silica particles coated with alumina, cationic silica sol, silica sol containing string-like silica particles, and silica sol containing silica particles having a shape where a plurality of spherical silica particles were tied one to the next. The zeolite structures of Examples 1 to 8 had an excellent bending strength.

Comparative Example 1 used, as the inorganic binding material, alkaline silica sol containing heretofore used typical spherical silica particles, whereby silica particles were mutually agglomerated in the zeolite raw material. In consequence, the bending strength of the zeolite structure lowered.

Comparative Example 2 used silica sol containing string-like silica particles (silica sol (4)) as the inorganic binding material, and had a high bending strength as compared with the zeolite structure of Comparative Example 1. However, the used amount of silica sol (4) was as small as 1400 g, and hence the bending strength clearly lowered as compared with the zeolite structures of Examples 1 to 8.

Comparative Example 3 used 6100 g of the above silica sol (4) as the inorganic binding material, and hence a large amount of water contained in silica sol (4) was included in the zeolite raw material. In consequence, a viscosity of the zeolite raw material lowered, shape retention properties lowered, and it was not possible to extrusion-form the structure.

A zeolite structure manufactured by a manufacturing method of the zeolite structure of the present invention can be used in an adsorbing material, a catalyst, a catalyst carrier, a gas separation film or an ion exchanger. In particular, the zeolite structure can preferably be utilized to purify an exhaust gas discharged from an engine for a car, an engine for a construction machine, an industrial stational engine, a burning apparatus or the like and containing NOx or the like.

Description of Reference Numerals

1: partition wall, 2: cell, 4: outer peripheral wall, 11: one end face, 12: the other end face, 32: zeolite particle, 33: inorganic binding material, 35: pore, 100 and 100a: zeolite structure.

What is claimed is:

1. A manufacturing method of a zeolite structure, comprising:
   a mixing step of mixing a plurality of zeolite particles, an inorganic binding material which binds the zeolite particles to one another, and an organic binder, to prepare a zeolite raw material;
   a forming step of extruding the prepared zeolite raw material to obtain a formed zeolite article; and
   a firing step of firing the obtained formed zeolite article to prepare the zeolite structure;
   wherein the inorganic binding material of the mixing step contains a silica sol containing string-like silica particles, and wherein a content ratio of silica particles contained in the silica sol is from 10 to 26 mass% with respect to 100 mass% of the zeolite particles.

2. The manufacturing method of the zeolite structure according to claim 1, wherein the inorganic binding material of the mixing step further contains at least one type selected from the group consisting of alumina sol, titania sol, zirconia sol, ceria sol, boehmite, montmorillonite, hydrotalcite, basic aluminum chloride, hydraulic alumina, silicon resin, and water glass, to prepare the zeolite raw material.

3. The manufacturing method of the zeolite structure according to claim 2, wherein the inorganic binding material is provided in the mixing step so that a volume of the fired inorganic binding material is from 10 to 50 vol% with respect to a volume of the zeolite structure.

4. The manufacturing method of the zeolite structure according to claim 3, wherein at least a part of the plurality of zeolite particles in the mixing step includes particles made of at least one type of zeolite selected from the group consisting of ZSM-5 type zeolite, β-type zeolite, Y-type zeolite, mordenite type zeolite, and ferrierite type zeolite.

5. The manufacturing method of the zeolite structure according to claim 4, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

6. The manufacturing method of the zeolite structure according to claim 3, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

7. The manufacturing method of the zeolite structure according to claim 3, wherein during the forming step, the zeolite raw material is extruded in a honeycomb shape including partition walls disposed to form a plurality of cells which become through channels of a fluid and extend from one end face to the other end face, to obtain the formed zeolite article.

8. The manufacturing method of the zeolite structure according to claim 3, wherein the inorganic binding material of the mixing step further contains at least one type of silica sol selected from the group consisting of acid silica sol, silica sol containing silica particles coated with alumina, cationic silica sol, and silica sol containing silica particles having a shape where a plurality of spherical silica particles are tied one to the next.

9. The manufacturing method of the zeolite structure according to claim 2, wherein at least a part of the plurality of zeolite particles in the mixing step includes particles made of at least one type of zeolite selected from the group consisting of ZSM-5 type zeolite, β-type zeolite, Y-type zeolite, mordenite type zeolite, and ferrierite type zeolite.

10. The manufacturing method of the zeolite structure according to claim 9, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

11. The manufacturing method of the zeolite structure according to claim 2, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

12. The manufacturing method of the zeolite structure according to claim 2, wherein during the forming step, the zeolite raw material is extruded in a honeycomb shape including partition walls disposed to form a plurality of cells which become through channels of a fluid and extend from one end face to the other end face, to obtain the formed zeolite article.

13. The manufacturing method of the zeolite structure according to claim 2, wherein the inorganic binding material of the mixing step further contains at least one type of silica sol selected from the group consisting of acid silica sol, silica sol containing silica particles coated with alumina, cationic silica sol, and silica sol containing silica particles having a shape where a plurality of spherical silica particles are tied one to the next.

14. The manufacturing method of the zeolite structure according to claim 1, wherein the inorganic binding material is provided in the mixing step so that a volume of the fired inorganic binding material is from 10 to 50 vol% with respect to a volume of the zeolite structure.

15. The manufacturing method of the zeolite structure according to claim 14, wherein at least a part of the plurality of zeolite particles in the mixing step includes particles made of at least one type of zeolite selected from the group consisting of ZSM-5 type zeolite, β-type zeolite, Y-type zeolite, mordenite type zeolite, and ferrierite type zeolite.

16. The manufacturing method of the zeolite structure according to claim 15, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

17. The manufacturing method of the zeolite structure according to claim 14, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

18. The manufacturing method of the zeolite structure according to claim 14, wherein during the forming step, the zeolite raw material is extruded in a honeycomb shape including partition walls disposed to form a plurality of cells which become through channels of a fluid and extend from one end face to the other end face, to obtain the formed zeolite article.

19. The manufacturing method of the zeolite structure according to claim 14, wherein the inorganic binding material of the mixing step further contains at least one type of silica sol selected from the group consisting of acid silica sol, silica sol containing silica particles coated with alumina, cationic silica sol, and silica sol containing silica particles having a shape where a plurality of spherical silica particles are tied one to the next.

20. The manufacturing method of the zeolite structure according to claim 1, wherein at least a part of the plurality of zeolite particles in the mixing step includes particles made of at least one type of zeolite selected from the group consisting of ZSM-5 type zeolite, β-type zeolite, Y-type zeolite, mordenite type zeolite, and ferrierite type zeolite.

21. The manufacturing method of the zeolite structure according to claim 20, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

22. The manufacturing method of the zeolite structure according to claim 1, wherein at least a part of the plurality of zeolite particles in the mixing step includes particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

23. The manufacturing method of the zeolite structure according to claim 1, wherein during the forming step, the zeolite raw material is extruded in a honeycomb shape including partition walls disposed to form a plurality of cells which become through channels of a fluid and extend from one end face to the other end face, to obtain the formed zeolite article.

24. The manufacturing method of the zeolite structure according to claim 1, wherein the inorganic binding material of the mixing step further contains at least one type of silica sol selected from the group consisting of acid silica sol, silica sol containing silica particles coated with alumina, cationic silica sol, and silica sol containing silica particles having a shape where a plurality of spherical silica particles are tied one to the next.

* * * * *